United States Patent Office 3,002,002
Patented Sept. 26, 1961

3,002,002
REDUCTION OF THE THIOPHENE NUCLEUS
Irving Wender, Pittsburgh, Pa., and Milton Orchin, Cincinnati, Ohio, assignors to the United States of America as represented by the Secretary of the Interior
No Drawing. Filed Apr. 2, 1957, Ser. No. 650,283
5 Claims. (Cl. 260—332.2)
(Granted under Title 35, U.S. Code (1952), sec. 266)

This invention herein described and claimed, may be manufactured and used by or for the Government of the United States of America, for governmental purposes without the payment of any royalties thereon or therefor.

This invention relates to the hydrogenation of the thiophene nucleus in the thiophenecarboxylate compounds by means of CO and $H_2$ while employing a cobalt carbonyl catalyst.

In our previous patent, U.S. 2,587,671, issued March 4, 1954, we have shown that thiophene compounds containing aldehyde, ketone and alcohol groups may be reacted with hydrogen and carbon monoxide in the presence of a metal carbonyl catalyst, so that the oxygen containing side chains are completely reduced. We have now found, surprisingly, that thiophene carboxylates are reduced only in the ring, and that the carboxylate side chain remains unaffected.

The reaction may be represented as follows:

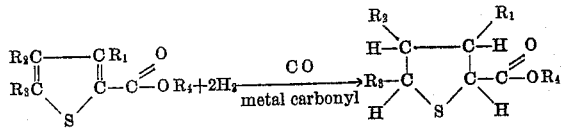

where $R_1$, $R_2$, $R_3$, and $R_4$ may be hydrogen or an organic radical, such as aryl, alkyl, aralkyl, cycloaliphatic, or carbon to carbon saturated heterocyclic radical, and may be the same, or different.

The active catalyst for this reaction is either cobalt octacarbonyl $[Co(CO)_4]_2$ or cobalt hydrocarbonyl $$[HCo(CO_4)]_2$$

Preformed carbonyl may be employed alone, or if desired, a cobalt salt, either organic or inorganic, or finely divided cobalt metal may be added together with the preformed carbonyl to the reaction mixture. In the latter case the cobalt carbonyl formed in situ under the reaction conditions further assists the reaction. Other carbonyls of metals of the eighth periodic group, particularly iron, may be employed. However, the cobalt compound is preferred since it is easier to handle and has a higher activity.

Formation of the entire cobalt carbonyl catalyst in situ by the use of a cobalt salt, e.g., cobalt acetate, in the reaction mixture does not generally give good results. We have found that this results in relatively poor yields and that long reaction times are required. The use of a preformed cobalt carbonyl catalyst, on the other hand, results in relatively good yields in relatively short reaction times. A large concentration of catalyst has also been found to be beneficial.

The stoichiometric quantity of hydrogen for complete reduction must of course be employed, and generally, the presence of an excess results in higher yields. Although only hydrogen takes an active part in the reduction, a mixture of hydrogen and carbon monoxide must be employed. The carbon monoxide does not participate directly in this reaction, but apparently functions to prevent decomposition of the cobalt carbonyl under the reaction conditions, and to assure the formation of the carbonyl where it is formed in situ. At a temperature of 180° C. a partial pressure of carbon monoxide in excess of 300 p.s.i., is necessary to assure the stability of cobalt carbonyl.

With these considerations in mind, ratios of $H_2:CO$ of from 5:1 to 20:1 may be employed. The preferred range however is 1:1 to 4:1.

The reaction temperature may vary between 110° C. and 220° C., and preferably between 120° C. and 180° C. Within these ranges the optimum temperature will vary with the particular starting material and the other reaction conditions. Elevated pressures of at least 500 p.s.i. and preferably 1500 to 3500 p.s.i. are employed.

The following specific example is given to illustrate the invention:

Reduction of ethyl 2-thiophenecarboxylate.—42.5 g. (0.27 mole) of ethyl 2-thiophenecarboxylate, 50 ml. of benzene, 1.3 g. of dicobalt octacarbonyl, and 2 g. of cobaltous carbonate were placed in the autoclave. Synthesis gas ($2H_2:1CO$) was admitted until the pressure was 3200 p.s.i. and the autoclave was heated at 185° for 3 hours; 0.7 mole of gas were absorbed in this interval.

Distillation of the reaction products yielded 28.8 g. of a fraction boiling at 113–117° at 26 mm. Hg. Infrared examination of this fraction showed that 11.4 g. (27%) of this mixture was unreacted starting material and 17.4 g. (40%) was ethyl 2-thiacyclopentanecarboxylate.

The reduction of ethyl 2-thiophenecarboxylate may be represented as follows:

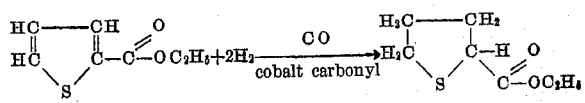

From the above description it is apparent that the present invention provides a convenient and relatively inexpensive method for reducing the thiophene nucleus in thiophene carboxylate compounds. The catalysts for the reaction are cheap and easily prepared, while the reducing gas can be any of the available technical mixtures of carbon monoxide and hydrogen, such as water gas.

It is to be understood that the above description together with the specific examples and embodiments described, are intended only to illustrate the invention, and that the invention is not to be limited thereto, nor in any way except by the scope of the appended claims.

We claim:
1. A method for reducing a lower alkyl 2-thiophenecarboxylate to the corresponding lower alkyl 2-thiacyclopentanecarboxylate which comprises, reacting said lower alkyl 2-thiophenecarboxylate with hydrogen in the presence of a cobalt carbonyl catalyst at a temperature of about 110° C. to about 220° C. under a pressure of at least about 500 p.s.i., while maintaining a concentration of carbon monoxide in the reaction zone at least sufficient to prevent decomposition of the cobalt catalyst.

2. A method as in claim 1 wherein the reaction zone is maintained at a temperature of about 120° C. to about 180° C. under a pressure of about 1500 p.s.i. to about 3500 p.s.i.

3. A method as in claim 1 wherein a cobalt salt is present in the reaction zone.

4. A method as in claim 1 wherein finely divided cobalt metal is present in the reaction zone.

5. The method of claim 1, wherein the lower alkyl 2-thiophenecarboxylate is ethyl 2-thiophenecarboxylate.

References Cited in the file of this patent

UNITED STATES PATENTS 2,506,536    Baker _____ May 20, 1950

FOREIGN PATENTS 405,017    Germany _____ Feb. 14, 1925

OTHER REFERENCES

Wender et al.: J.A.C.S., vol. 72, pp. 4375–78 (1950).